United States Patent
Register et al.

(10) Patent No.: US 11,680,576 B2
(45) Date of Patent: Jun. 20, 2023

(54) EDGE-LIT LIGHT KIT FOR CEILING FANS

(71) Applicant: Hubbell Incorporated, Shelton, CT (US)

(72) Inventors: Walter Steven Register, Anderson, SC (US); Palmer Joseph Primm, Greenville, SC (US); Dhavalkumar Prabhudas Patel, Greer, SC (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 17/952,861

(22) Filed: Sep. 26, 2022

(65) Prior Publication Data

US 2023/0014714 A1 Jan. 19, 2023

Related U.S. Application Data

(63) Continuation of application No. 16/857,646, filed on Apr. 24, 2020, now Pat. No. 11,454,244.

(60) Provisional application No. 62/837,838, filed on Apr. 24, 2019.

(51) Int. Cl.
*F04D 29/00* (2006.01)
*H05B 45/20* (2020.01)
*F04D 25/08* (2006.01)

(52) U.S. Cl.
CPC ......... *F04D 29/005* (2013.01); *F04D 25/088* (2013.01); *H05B 45/20* (2020.01)

(58) Field of Classification Search
CPC .... F04D 29/005; F04D 25/088; F04D 19/005; H05B 45/20; H05B 47/115; H05B 47/19; F21Y 2103/33; F21Y 2115/10; F21V 33/0096; G02B 6/0011
See application file for complete search history.

(56) References Cited

U.S. PATENT DOCUMENTS

2015/0009666 A1* 1/2015 Keng .................. F21V 33/0096
362/249.02

* cited by examiner

*Primary Examiner* — Jacob M Amick
*Assistant Examiner* — Charles J Brauch
(74) *Attorney, Agent, or Firm* — Robinson + Cole LLP

(57) ABSTRACT

A ceiling fan is provided. The ceiling fan includes one or more fan blades. The ceiling fan further includes a motor. The motor is operatively coupled to the one or more fan blades. The motor is configured to drive rotation of the one or more fan blades. The ceiling fan further includes a light kit. The light kit includes a panel. The panel has an edge extending between a top surface of the panel and a bottom surface of the panel. The light kit further includes at least one light source positioned to illuminate the edge.

20 Claims, 14 Drawing Sheets

EDGE-LIT LIGHT KIT FOR CEILING FANS

RELATED CASES

This application is a continuation of U.S. patent application Ser. No. 16/857,646, filed Apr. 24, 2020, now U.S. Pat. No. 11,454,244, which claims the benefit of U.S. Provisional Patent Application No. 62/837,838, filed on Apr. 24, 2019, the entire contents of which are incorporated herein by reference.

FIELD

Embodiments generally relate to ceiling fans and, more particularly, to edge-lit light kits for ceiling fans.

SUMMARY

Ceiling fans may be configured to circulate air within a room. Example ceiling fans include a plurality of fan blades and a motor operatively coupled to the fan blades. The motor is configured to receive an input power from a power source and converts the input power to mechanical energy needed to drive rotation of the fan blades to circulate the air within the room.

In one embodiment, a ceiling fan includes one or more fan blades. The ceiling fan furthers include a motor operatively coupled to the one or more fan blades and configured to drive rotation of the one or more fan blades. The ceiling fan further includes a light kit comprising a panel having an edge extending between a top surface of the panel and a bottom surface of the panel. The light kit further include at least one light source positioned to illuminate the edge.

In some embodiments, the panel includes a light guide. In some embodiments, the light kit further includes a diffuser positioned such that the diffuser diffuses light exiting the panel. In some embodiments, the light kit further includes a light reflector positioned to reflect light exiting the panel. In some embodiments, the panel is positioned between the light reflector and the diffuser. In some embodiments, the at least one light source comprises a light emitting diode (LED) array having a plurality of LED light sources. In some embodiments, the one or more fan blades are positioned between the light kit and a ceiling to which the ceiling fan is mounted. In some embodiments, the ceiling fan further includes a body configured to accommodate the panel and the at least one light source.

In some embodiments, the ceiling fan further comprises a first switching device configured to control operation of the motor, and a second switching device configured to control operation of the at least one light source. In some embodiments, the second switching device is configured to adjust a color temperature of light emitted from the at least one light source. In some embodiments, the first switching device and the second switching device each comprise a pull chain switch. In some embodiments, the second switching device is mounted such that the second switching device extends through an opening defined by the diffuser.

In another embodiment, a light kit for a ceiling fan comprises a panel having an edge extending between a top surface of the panel and a bottom surface of the panel. The light kit further includes at least one light source positioned to illuminate the edge of the panel, and a mounting bracket configured to secure the light kit to the ceiling fan.

In some embodiments, the light kit includes a diffuser positioned to diffuse light exiting the panel. In some embodiments, the light kit includes a light reflector positioned to reflect light exiting the panel. In some embodiments, the panel is positioned between the light reflector and a diffuser positioned to diffuse light exiting the panel. In some embodiments, the at least one light source is positioned between the light reflector and a diffuser positioned to diffuse light exiting the panel. In some embodiments, the light kit further includes a body having a lip to support the panel, and a backplate coupleable to the body such that the panel is positioned between the backplate and the lip of the body.

In some embodiments, the mounting bracket is removably coupled to the backplate via one or more fasteners extending through one or more slots defined by the backplate. In some embodiments, the light kit further includes a switching device configured to control operation of the at least one light source. In some embodiments, the switching device is mounted to a body of the light kit. In some embodiments, the switching device is mounted such that the switching device extends through an opening defined by a diffuser. In some embodiments, the at least one light source comprises a light emitting diode (LED) array having a plurality of LED light sources. In some embodiments, the light kit further includes a camera positioned within an opening defined by a diffuser.

Aspects and advantages of embodiments of the present disclosure will be set forth in part in the following description, or may be learned from the description, or may be learned through practice of the embodiments.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the disclosure.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
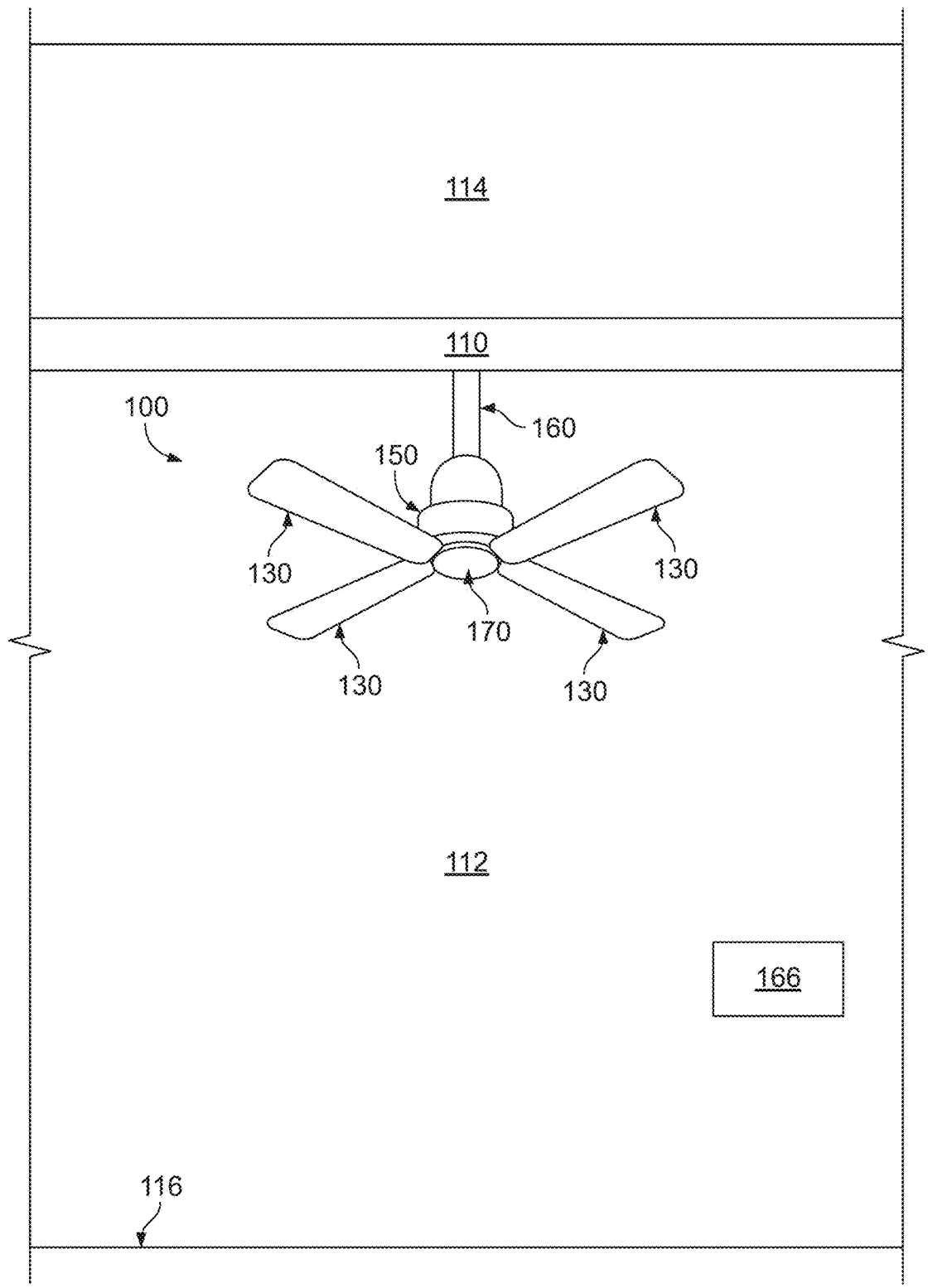
FIG. 1 provides a perspective view of a ceiling fan suspended from a ceiling according to some embodiments.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

The light kit of the present disclosure can provide numerous technical benefits. For instance, positioning the light source to illuminate the edge of the panel allow for light to be uniformly distributed through the diffuser of the light kit. In this manner, the appearance of several light sources each individually emitting light can be avoided. Furthermore, positioning the light source to illuminate the edge of the panel makes the light kit suitable for low profile lighting applications.

As used herein, a "light kit" refers to a device used to provide light or illumination using one or more light sources. In addition, the terms "first" and "second" may be used interchangeably to distinguish one component from another and are not intended to signify location or importance of the individual components. Furthermore, the use of the term "about" in conjunction with a numerical value is intended to refer to within 25% of the stated numerical value.

Figure 2:
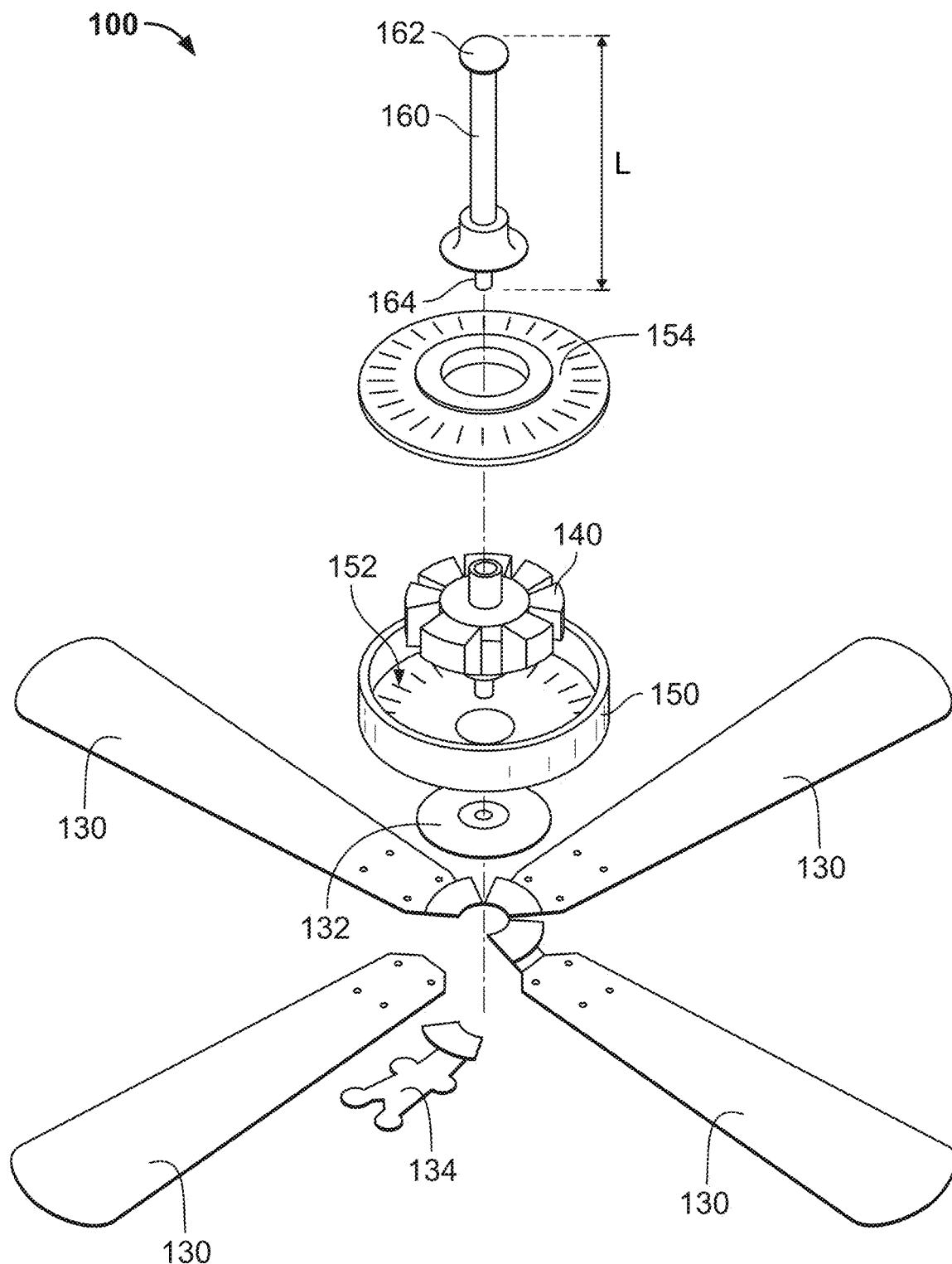
FIG. 2 provides an exploded view of a ceiling fan according to some embodiments.
Figure 3:
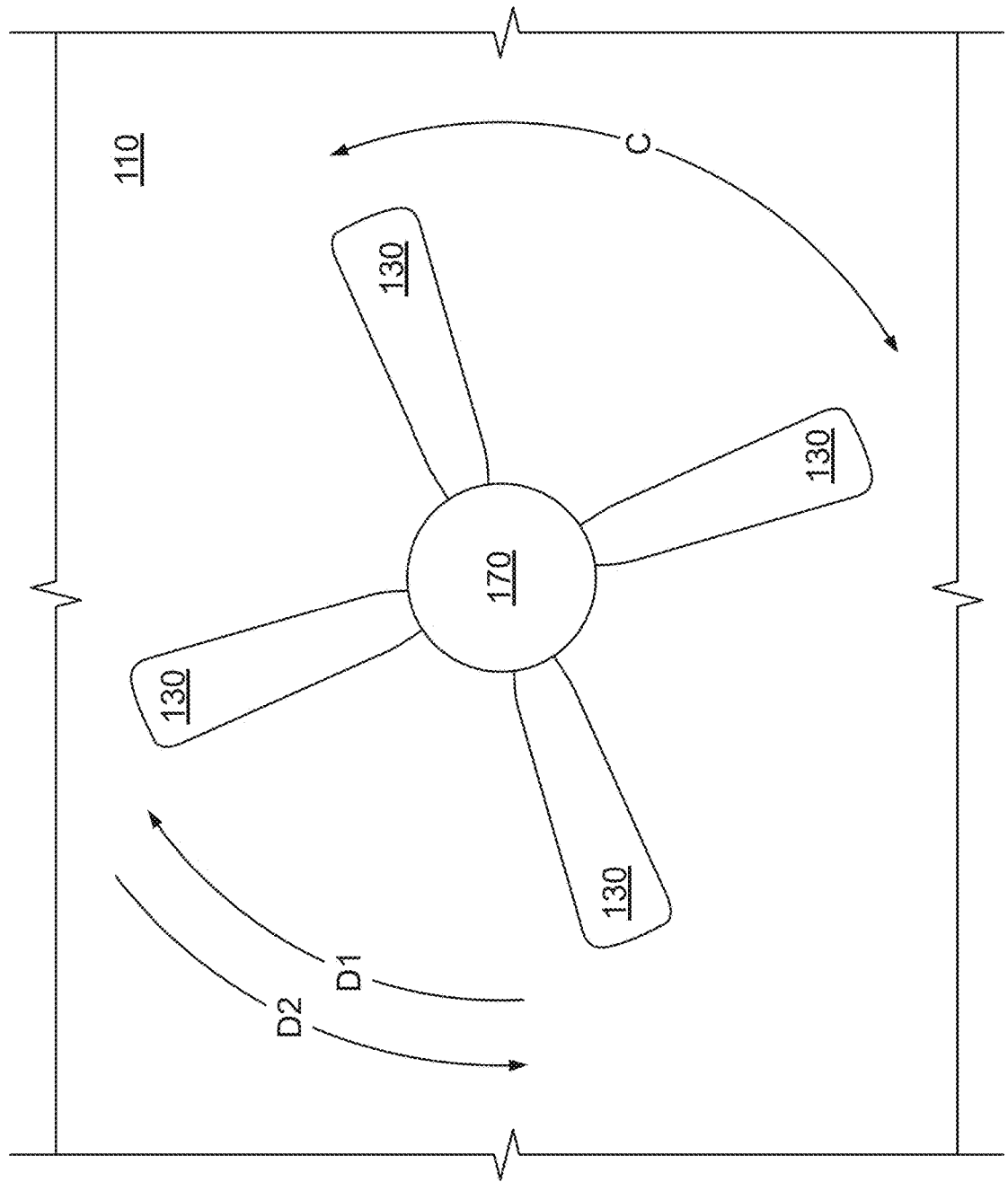
FIG. 3 provides a bottom-up view of a ceiling fan according to some embodiments.

Referring now to the FIGS., FIGS. 1 through 3 depict a ceiling fan 100 according to example embodiments of the present disclosure. The fan 100 may be removably mounted to a ceiling 110 separating a first space 112 (e.g., positioned beneath the ceiling 110) from a second space 114 (e.g., positioned above the ceiling 110). In some embodiments, the fan 100 includes a plurality of fan blades 130. As shown, each the plurality of blades 130 may be coupled to a blade hub 132. More specifically, each of the blades 130 may be coupled to the blade hub 132 via a blade arm 134. It should be appreciated that the blade arm 134 may be coupled to the blade hub 132 and a corresponding fan blade 130 via a suitable fastener (e.g., screw, bolt, etc.). As shown, the fan blades 130 may be coupled to the blade hub 132 via the blade arm 134 such that the fan blades 130 are spaced apart from one another along a circumferential direction C.

In some embodiments, the fan 100 includes an electric motor 140. The motor 140 may be configured to receive an input power from a power source, such as an alternating current (AC) power source or a direct current (DC) power source. Furthermore, the motor 140 may be operatively coupled to the blades 130 via the blade hub 132. In this manner, the motor 140 may convert the input power into mechanical energy needed to drive rotation of the blades 130 along the circumferential direction C. In some embodiments, the motor 140 may be configured to drive rotation of the blades 130 in a first direction $D_1$ or a second direction $D_2$ that is different than the first direction $D_1$. For example, the blades 130 move air in the first space 112 towards the ceiling 110 when rotated in the first direction $D_1$. Conversely, the blades 130 may move air away from the ceiling 110 when rotated in the second direction $D_2$. More specifically, the blades 130 may move air towards a floor 116 defining the first space 112.

In some embodiments, the fan 100 includes a fan motor housing 150 configured to accommodate the motor 140. More specifically, the motor 140 may be positioned within a cavity 152 defined by the fan motor housing 150. In addition, the fan 100 may include a cover 154 that may be coupled to the fan motor housing 150. In particular, the cover 154 may be coupled to the fan motor housing 150 such that the motor 140 positioned within the cavity 152 may be hidden from view.

As shown, the fan 100 may be suspended from the ceiling 110 via a downrod 160 having a first end 162 and a second end 164. It should be appreciated that the first end 162 and the second end 164 may be spaced apart from one another along a length L of the downrod 160. In some embodiments, the first end 162 of the downrod 160 may be coupled to a support (e.g., mounting bracket) positioned within the ceiling 110 or the second space 114. In addition, the housing 150 may be coupled to the second end 164 of the downrod 160.

In some embodiments, operation of the fan 100 is controlled by a control system 166. The control system 166 may include a wall-switch that may be manipulated to selectively couple the motor 140 to a power supply. In this way, the control system 166 may selectively activate (e.g., turn on) or deactivate (e.g., turn off) the motor 140 to control rotation of the blades 130. In some embodiments, the control system 166 controls operation of other devices. For instance, the control system 166 may be configured to adjust a position of window blinds (not shown) in the first space 112. More specifically, the control system 166 may adjust a position of the window blinds to or towards a fully open position or a fully closed position. In this way, an amount of natural light entering the first space 112 through one or more windows is controlled.

Figure 4:
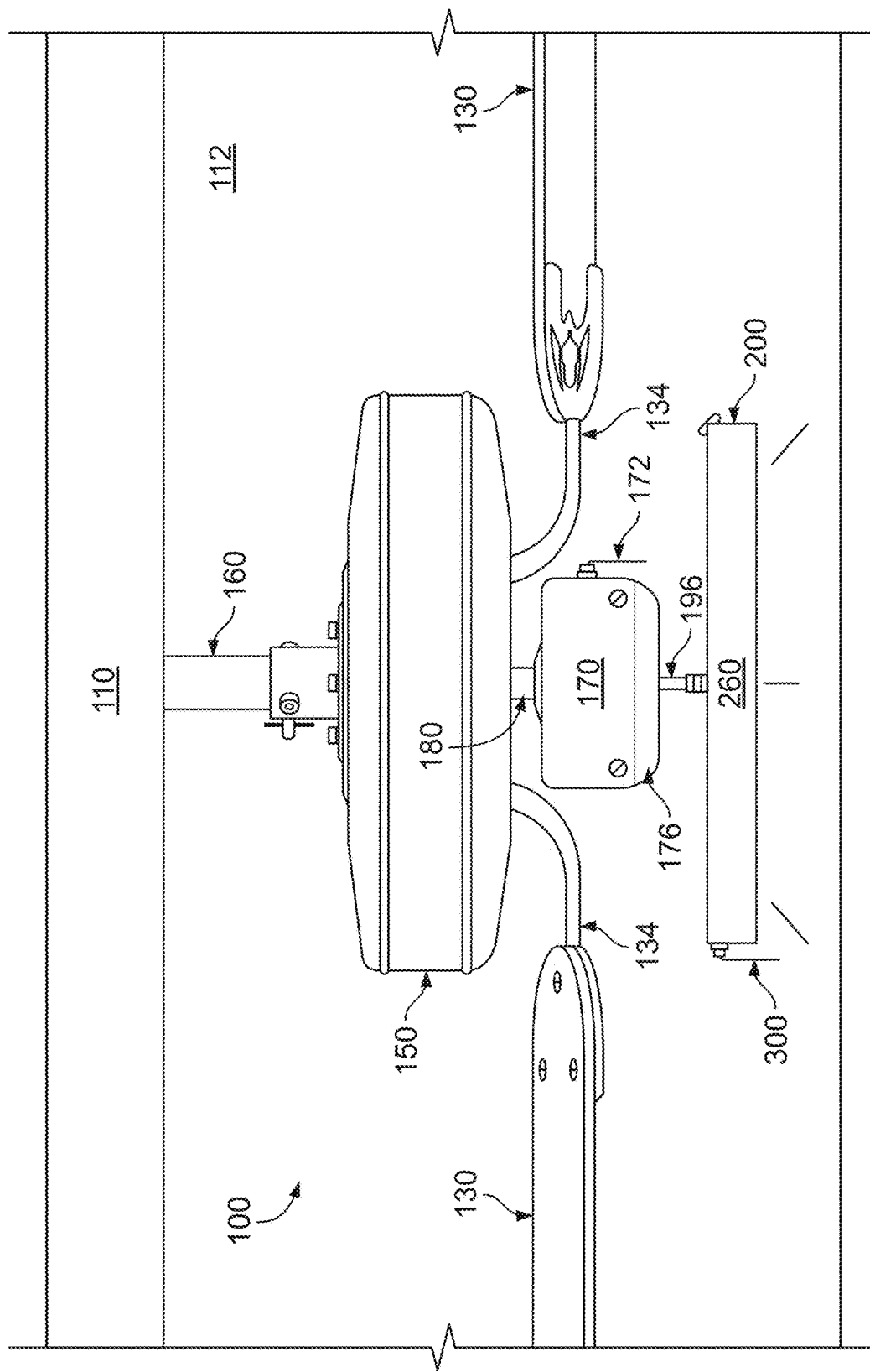
FIG. 4 provides a ceiling fan having a light kit according to some embodiments.
Figure 5:
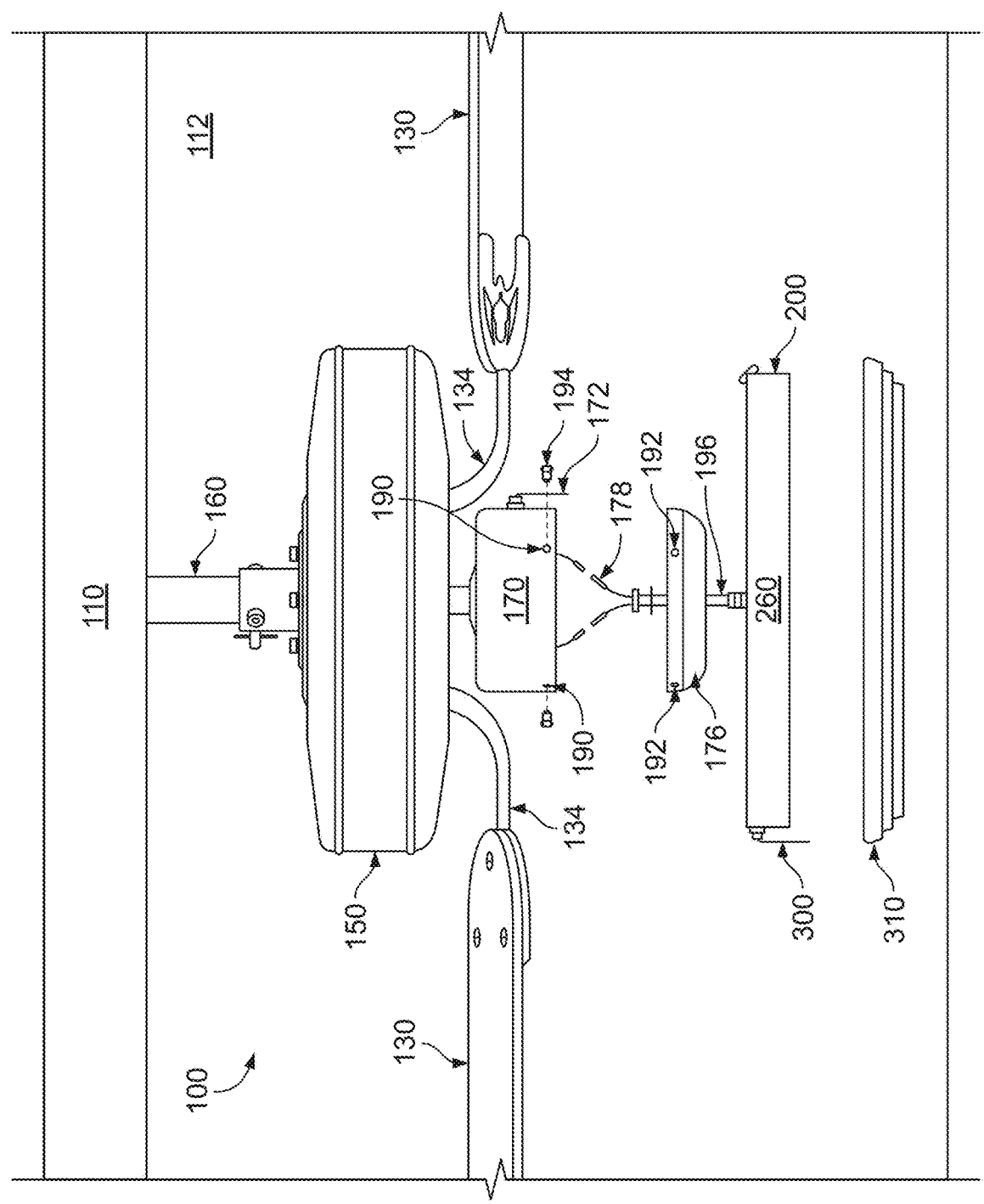
FIG. 5 provides an exploded view of a portion of the ceiling fan depicted in FIG. 4 according to some embodiments.

Referring now to FIGS. 4 and 5, the fan 100 may include a switch housing 170 coupled to the fan motor housing 150. In particular, the switch housing 170 may be coupled to the fan motor housing 150 such that the fan motor housing 150 is positioned between the ceiling 110 and the switch housing 170. In some embodiments, the switching housing 170 is coupled to a first support 180 extending from the fan motor housing 150. As will be discussed below in more detail, the switch housing 170 may accommodate a switching device 172 configured to control operation of the fan 100.

As shown, in some embodiments the switching device 172 is a pull-chain switch that may be pulled by a user to control operation of fan 100. For instance, the pull-chain may be pulled by the user to couple the motor 140 to the power source such that the motor 140 receives electrical power from the power source and converts the electrical power to mechanical energy to drive rotation of the blades 130. In this manner, rotation of the blades 130 may circulate air within the first space 112. In addition, the user may pull the pull-chain switch again to decouple the motor 140 from the power source such that the motor 140 no longer receives electrical power from the power source and, as a result, no longer drives rotation of the blades 130. In some embodiments, the pull-chain is pulled to adjust a speed (e.g., slow, medium, fast) at which the motor 140 rotates the blades 130.

In some embodiments, the fan 100 includes a cover 176 removably coupled to the switch housing 170 such that electrical conductors 178 (e.g., wires) positioned within the switch housing 170 may be hidden from view. As shown, in some embodiments the switch housing 170 defines a first plurality of holes or apertures 190. In addition, the cover 176 may define a second plurality of holes or apertures 192. The cover 176 may be mounted to the switch housing 170 such that each of the second plurality of apertures 192 defined by the cover 176 is aligned with a corresponding aperture of the first plurality of apertures 190 defined by the switching housing 170. Furthermore, fasteners 194 may be used to secure the cover 176 to the switch housing 170. In some embodiments, the fasteners 194 are screws. However, any suitable type of fastener may be used to secure the cover 176 to the switching housing 170.

It should also be appreciated that the present disclosure is not limited to the fan 100 described above with reference to FIGS. 1 through 5. For example, the fan 100 may be a bladeless fan. It should also be appreciated that the present disclosure is intended to cover ceiling fans suitable for outdoor environments, indoor environments, or both.

Referring still to FIGS. 4 and 5, the fan 100 includes a light kit 200. As shown, the light kit 200 may be coupled to the switch housing 170. In particular, the light kit 200 may be coupled to a second support 196 extending through an aperture (not shown) defined by the cover 176 for the switch housing 170. It should be appreciated, however, that the light kit 200 may be coupled to any suitable location on the fan 100. As will be discussed below in more detail, the light kit 200 may be configured to illuminate the first space 112.

Figure 6:
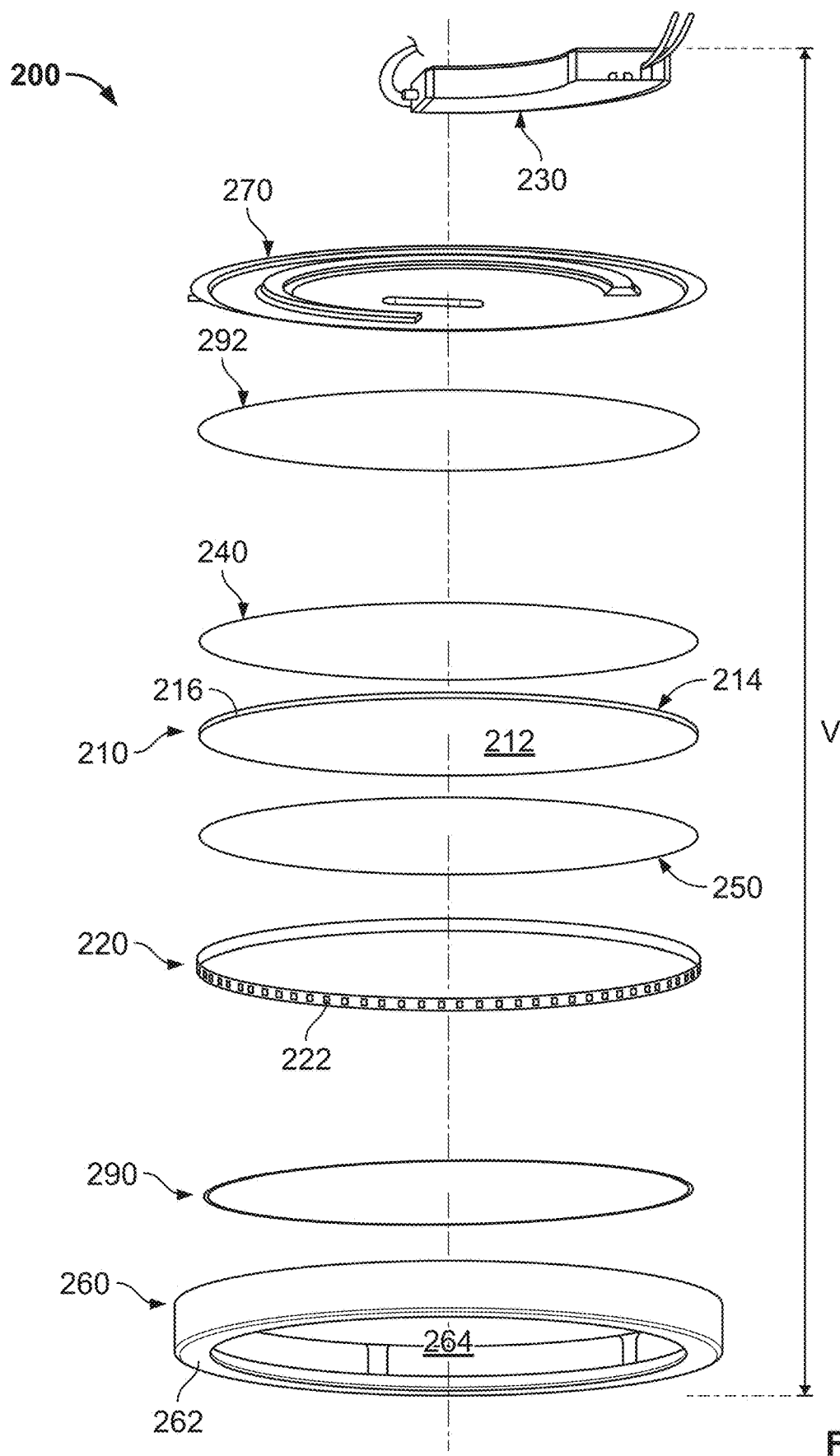
FIG. 6 provides an exploded view of a light kit for a ceiling fan according to some embodiments.
Figure 7:
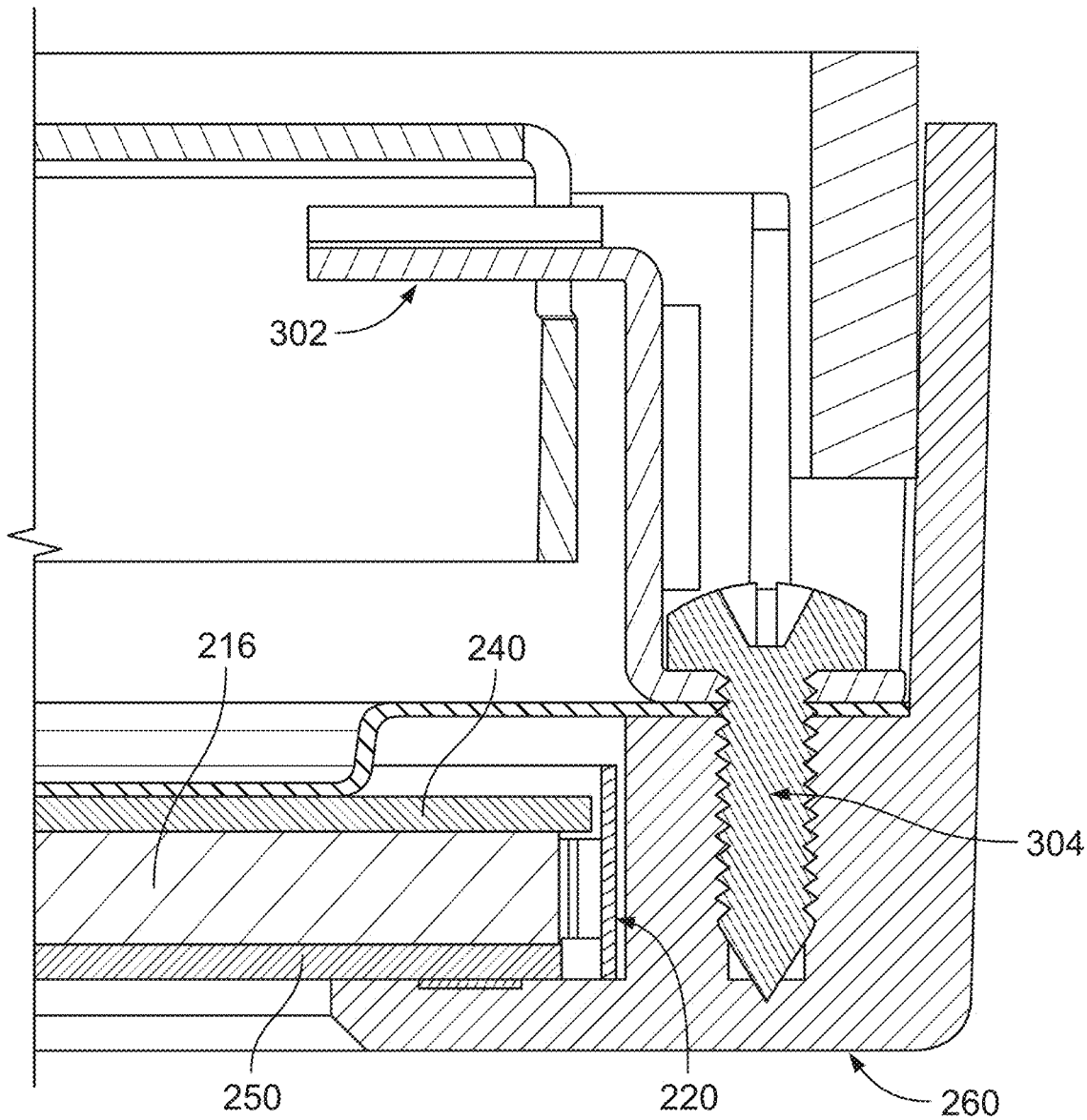
FIG. 7 provides a cross-sectional view of a portion of a light kit according to some embodiments.
Figure 8:
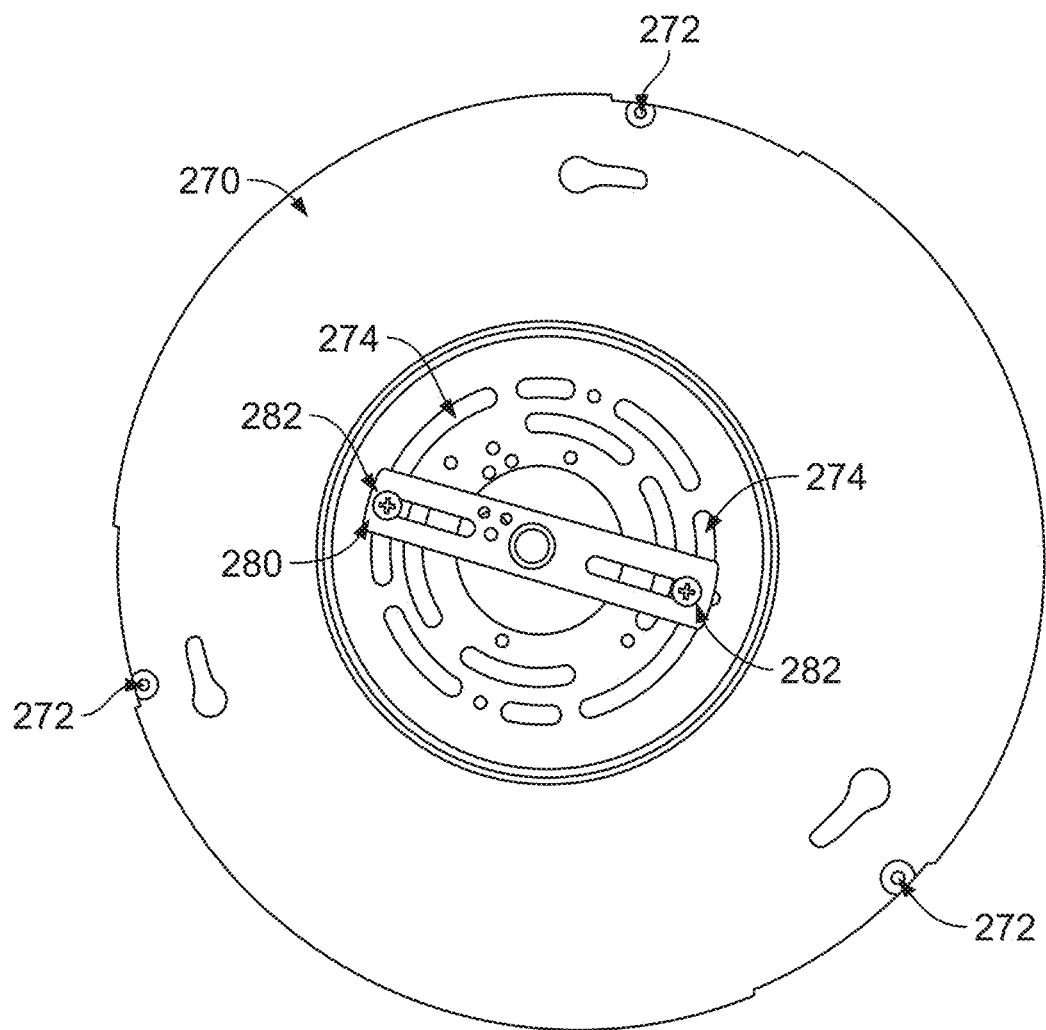
FIG. 8 provides a top-down view of a light kit for a ceiling according to some embodiments.

Referring now to FIGS. 6 through 8, the light kit 200 may include a panel 210. As shown, the panel 210 includes a top surface 212 and a bottom surface 214. In addition, the panel 210 may include an edge 216 extending between the top surface 212 and the bottom surface 214. In some embodiments, the panel 210 may be a light guide. As will be discussed below in more detail, the light kit 200 may include a light source 220 positioned to illuminate the edge 216 of the panel 210. In this way, the panel 210 acts as an edge lit light source for illuminating a space beneath the ceiling fan 100.

In some embodiments, the light source 220 may be a LED array having a plurality of LED light sources 222 positioned to illuminate the edge 216 of the panel 210. It should be appreciated that a color temperature of light emitted by the plurality of LED light sources 222 may correspond to any suitable color and/or color temperature of light. For example, the LED light sources 222 may be configured to emit light having a color temperature of about 3000K. As another example, the LED light sources 222 may be configured to emit light having a color temperature of about 5000K.

In some embodiments, the light kit 200 includes a driver circuit 230. The driver circuit 230 may, for instance, receive an input power from a power source (e.g., mains power supply) via the conductors 178 (FIG. 5) positioned within the switch housing 170. The driver circuit 230 may be configured to convert the input power to a driver current suitable for powering the light source 220. The driver circuit 230 may include various components, such as switching elements (e.g., transistors). Gate timing commands may be provided to the one or more switching elements to convert the AC input power to the driver current. In some embodiments, the driver circuit 230 is potted. In other embodiments, the driver circuit 230 is not potted.

In example embodiments, the driver circuit 230 adjusts the driver output based, at least in part, on a dimming control signal (e.g., 0V to 10V dimming control signal). More specifically, the dimming control signal may be indicative of a voltage (e.g., 0V to 10V) at a control input of the driver circuit 230. For example, reducing the dimming control signal by 50% may result in a corresponding reduction in the driver output provided to the light source 220. The reduction of the driver output may reduce the overall driver current for supply to the light source 220. As a result, the lumen output of the light source 220 may be adjusted (e.g., dimmed) by varying the dimming control signal.

In some embodiments, the light kit 200 includes a light reflector 240 positioned to reflect or absorb light exiting the panel 210. For example, the light reflector 240 may be positioned such that light exiting the top surface 212 of the panel 210 may be absorbed or reflected back towards the panel 210, specifically the top surface 212 thereof Alternatively or additionally, the light kit 200 may include a diffuser 250 positioned to diffuse light exiting panel 210. For instance, the diffuser 250 may be positioned to diffuse light exiting the bottom surface 214 of the panel 210. In this manner, the light exiting the bottom surface 214 of the panel 210 is distributed in a uniform manner.

In some embodiments, at least a portion of the diffuser 250 includes a patterned surface. For instance, the patterned surface may correspond to a pattern of wallpaper used on one or more walls of the first space 112 (FIG. 4) in which the fan 100 is located. Alternatively, the patterned surface may correspond to the pattern (e.g., hardwood, tile, laminate, linoleum, vinyl, etc.) of the floor 116 (FIG. 1) defining the first space 112. As another alternative, the patterned surface may correspond to the pattern of the ceiling 110 (FIG. 4) defining the first space 112.

In some embodiments, the patterned surface includes one or more logos. For instance, the one or more logos may be associated with a sports team (e.g., football, basketball, baseball, etc.). Alternatively, the one or more logos may be associated with a company or individual. It should be appreciated, however, that the one or more logos may be associated with any suitable source.

In some embodiments, the light kit 200 includes a body 260. As shown, the body 260 may include a lip 262. The diffuser 250 may be positioned on the lip 262 such that a portion of the diffuser 250 is visible through an opening 264 defined by the body 260. In addition, the panel 210 and the light reflector 240 may be stacked on top of the diffuser 250 such that the panel 210 is positioned between the light reflector 240 and the diffuser 250 along a vertical direction V.

In some embodiments, the light kit 200 includes a backplate 270. As shown, the backplate 270 may define a third plurality of holes or apertures 272 and may be positioned on the body 260 such that each of the third plurality of apertures 272 is aligned with a corresponding hole or aperture (not shown) defined by the body 260. Furthermore, fasteners (not shown) may be used to secure the backplate 270 to the body 260. In some embodiments, the fasteners are screws. It should be appreciated, however, that any suitable type of fastener may be used to secure the backplate 270 to the body 260. It should be appreciated that the panel 210, light reflector 240, and diffuser 250 may be retained within the body 260 when the backplate 270 is secured to body 260.

In some embodiments, the driver circuit 230 may be mounted to the backplate 270. In particular, the driver circuit 230 may be mounted to the backplate 270 such that the driver circuit 230 is positioned between the panel 210 and the backplate 270. Alternatively or additionally, the backplate 270 may define one or more slots 274. In this manner, a mounting bracket 280 of the light kit 200 may be secured to the backplate 270 via fasteners 282 extending through the one or more slots 274. The mounting bracket 280 may be used to secure the light kit 200 to the fan 100 such that the blades 130 are positioned between the light kit 200 and the ceiling 110. In particular, the mounting bracket 280 may be used to secure the light kit 200 to the second support 196 (FIG. 4) extending from the switch housing 170.

In some embodiments, the light kit 200 includes an adhesive material 290 positioned between the diffuser 250 and the lip 262 of the body 260. In this manner, the adhesive material 290 secures the diffuser 250 to the lip 262 of the body 260. In some embodiments, the adhesive material 290 includes silicone. It should be appreciated, however, that any suitable type of adhesive material that may be used to secure the diffuser 250 to the body 260.

In some embodiments, the light kit 200 includes a gasket 292 positioned between the light reflector 240 and the backplate 270. As such, the panel 210 and the light source 220 may be protected from an external environment (e.g., first space 112) surrounding the light kit 200. In this manner, the light kit 200 may be suitable for use with ceiling fans used in outdoor environments.

Referring again to FIGS. 4 and 5, the light kit 200 includes a switching device 300 configured to control operation of the light kit 200. In some embodiments, the switching device 300 may be a pull-chain switch mounted to the body 260 of the light kit 200. In particular, the pull-chain switch may be pulled by a user to selectively couple the light source 220 (FIG. 6) to the power source. When the light source 220 is coupled to the power source via the switching device 300, the light source 220 may receive electrical power from the power source. In this manner, the light source 220 illuminates the edge 216 (FIG. 6) of the panel 210 (FIG. 6). When the light source 220 is decoupled from the power source, the light source 220 does not receive electrical power from the power source and, as a result, does not illuminate the edge 216 of the panel 210. In this manner, the switching device 300 may be actuated (e.g., pulled) to activate (e.g., turn on) the light source 220 and deactivate (e.g., turn off) the light source 220. In some embodiments, the switching device 300 may be actuated (e.g., pulled) to adjust a color temperature of light emitted from the light source 220 (FIG. 6). In alternative embodiments, however, the light kit 200 includes a separate switching device that may be actuated to adjust the color temperature of light emitted from the light source 220. In such embodiments, the separate switching device may be mounted to the body 260.

In some embodiments, the light kit 200 includes a bracket 302 that may be attached to the body 260 of the light kit 200 via one or more fasteners 304 (FIG. 8). Alternatively or additionally, the light kit 200 may include a decorative trim 310. For instance, the trim 310 may accommodate the body 260 having a diameter of about 5 inches, about 7 inches, about 11 inches, about 14 inches, or about 18 inches. In this manner, the body 260 may be hidden from view when the trim 310 is mounted to the body 260. It should be appreciated that the trim 310 may be mounted to the body 260 via any suitable method. For instance, in some embodiments the trim 310 engages one or more tabs (not shown) on the body 260.

Figure 9:
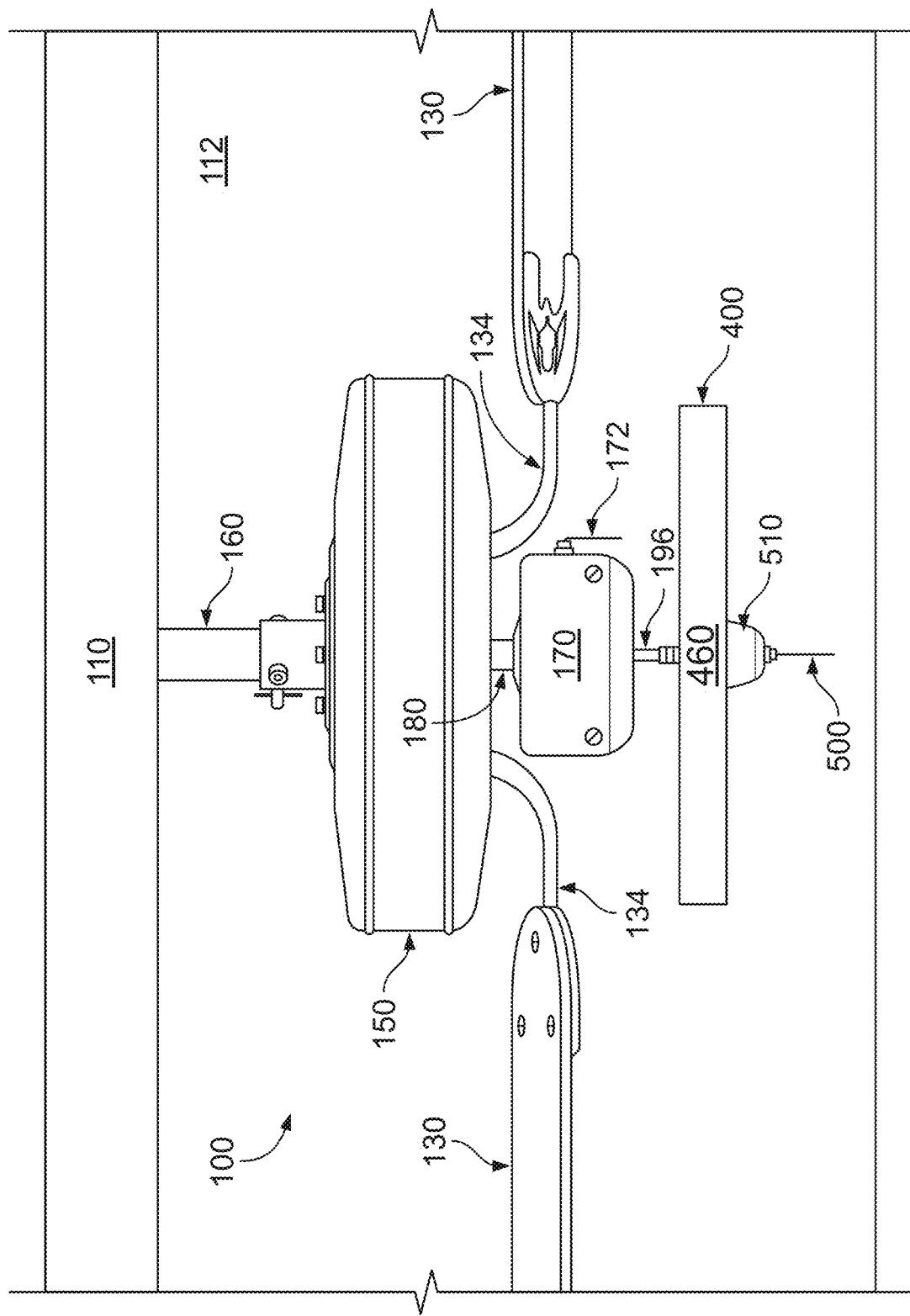
FIG. 9 provides a fan having a light kit according to some embodiments.
Figure 10:
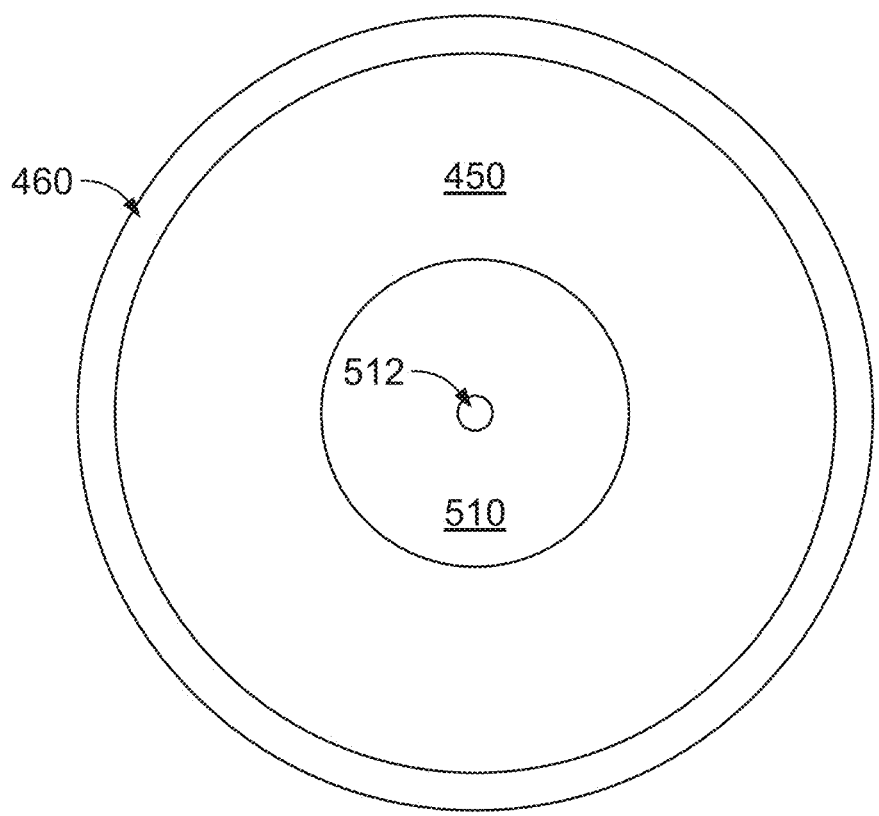
FIG. 10 provides a bottom-up view of the light kit depicted in FIG. 9 according to some embodiments.

Referring now to FIGS. 9 and 10, another light kit 400 is provided according to another embodiment of the present disclosure. It should be appreciated that the light kit 400 of FIG. 9 may be configured in substantially the same manner as the light kit 200 discussed above with reference to FIGS. 4-8. For instance, the light kit 400 of FIG. 9 may include a body 460 similar to the body 260 of the light kit 200 depicted in FIG. 6. In addition, the light kit 400 of FIG. 9 may include a switching device 500 similar to the switching device 300 of the light kit 200 depicted in FIG. 4. However, the switching device 500 may not be mounted to the body 460 of the light kit 400, and instead may be mounted such that the switching device 500 extends through an opening (not shown) defined by the diffuser 450 of the light kit 400. More specifically, the opening may be positioned at about a center of the diffuser 450. The diffuser 450 may be similar to that of the diffuser 250.

In some embodiments, the switching device 500 is a pull-chain switch. In such embodiments, the light kit 400 may include a canopy 510. As shown, the canopy 510 may be mounted such that the canopy 510 covers the portion of the diffuser 450 defining the opening through which the switching device 500 extends. Furthermore, the canopy 510 may define an opening 512 configured to accommodate the pull-chain switch extending therethrough.

Figure 11:
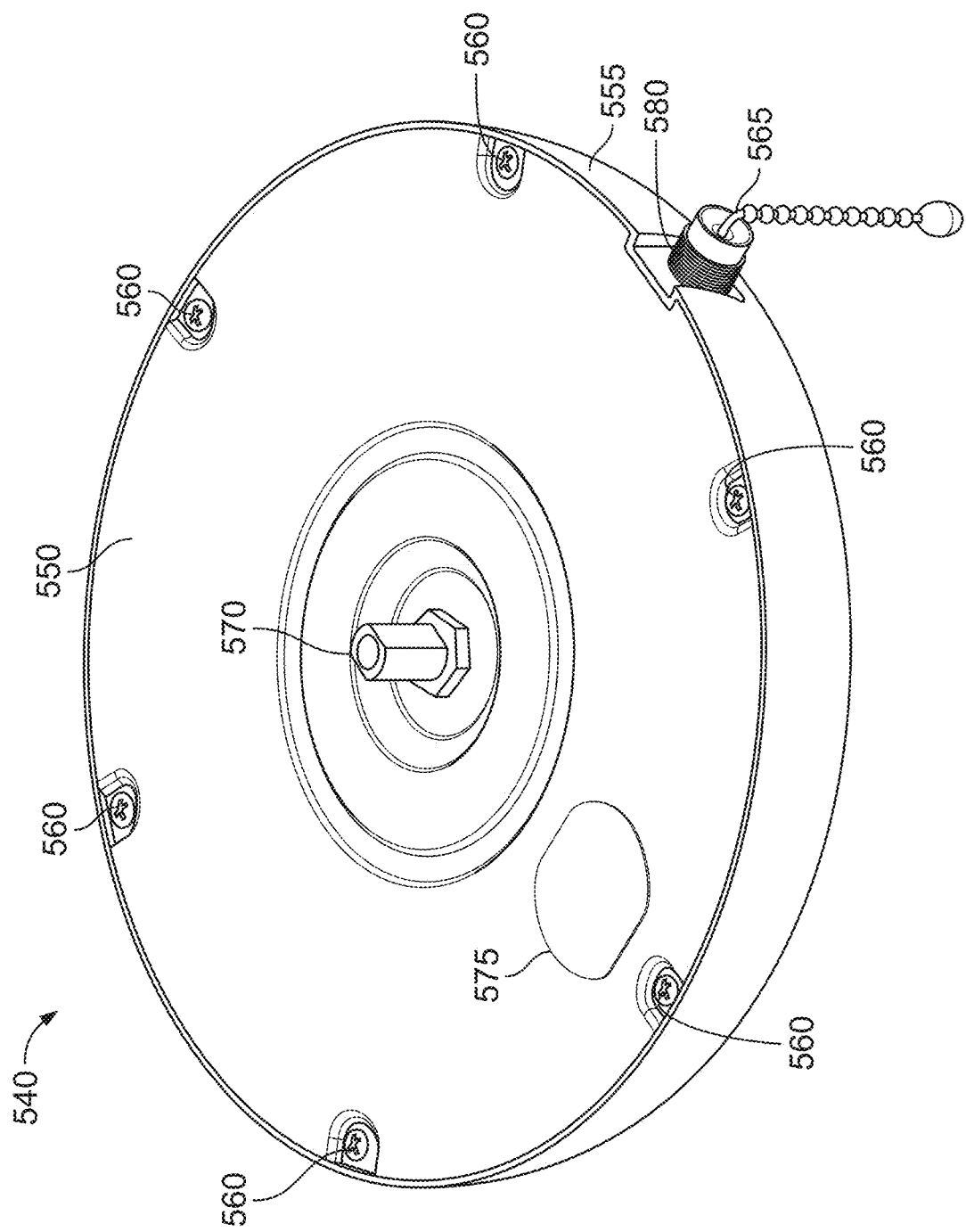
FIG. 11 provides a perspective view of an alternative embodiment of the light kit according to some embodiments.
Figure 12:
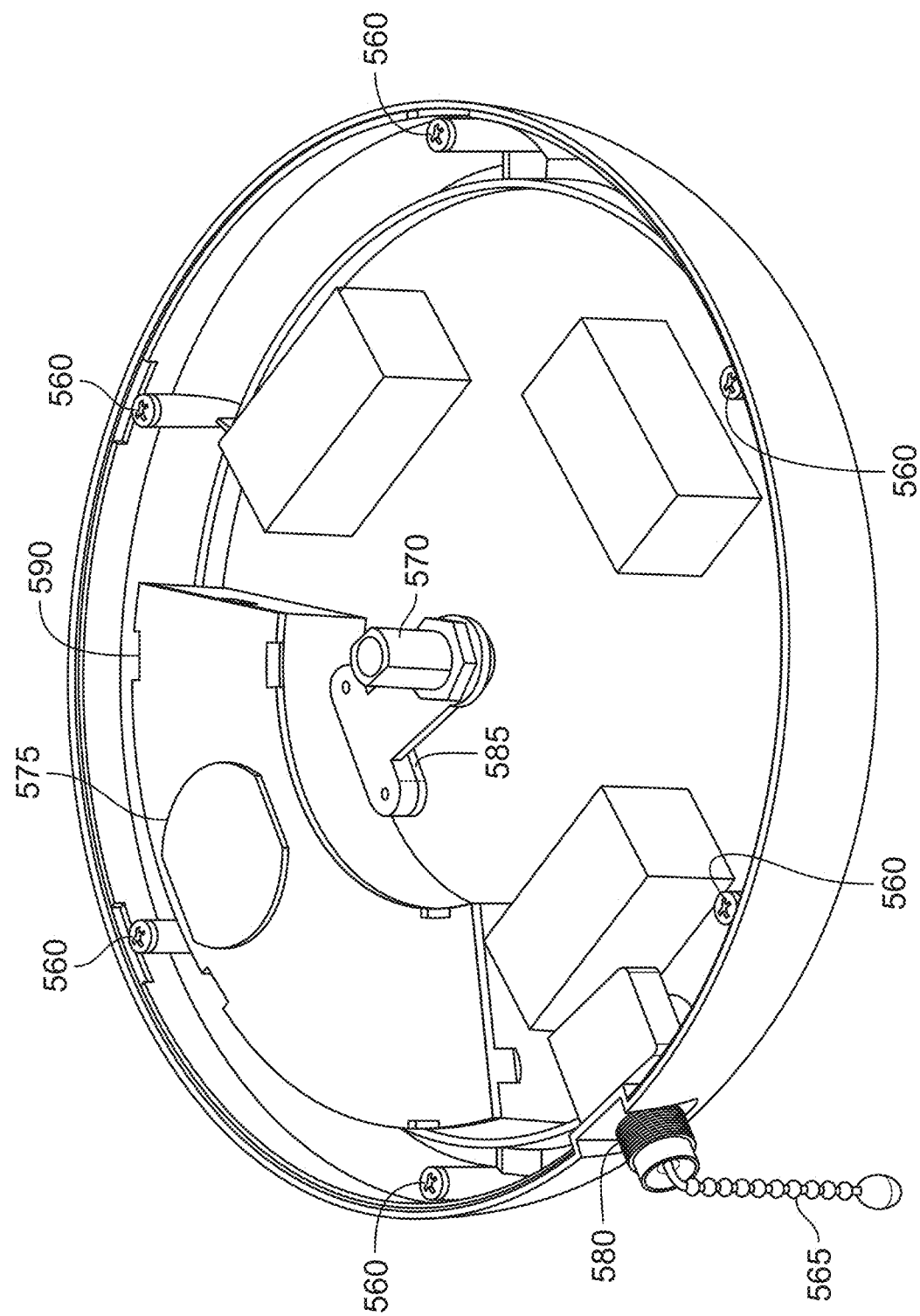
FIG. 12 provides a cross-sectional view of the light kit of FIG. 11 according to some embodiments.

Referring now to FIGS. 11 and 12, another light kit 540 is provided according to another embodiment of the present disclosure. It should be appreciated that the light kit 540 of FIG. 11 may be configured in substantially the same manner as the light kit 400 discussed above with reference to FIGS. 9 and 10. For instance, the light kit 540 may include a body 555 and a backplate 550. In some embodiments, the body 555 is substantially curved. In other embodiments, the body 555 may include square edges, arced edges, or edges of other desired shapes. Furthermore, fasteners 560 may be used to secure the cover backplate 550 to the body 555. In some embodiments, the fasteners 560 are screws. However, any suitable type of fastener may be used to secure the backplate 550 to the body 555. Furthermore, more or less fasteners 560 may be used.

In addition, the light kit 540 of FIG. 11 may include a switching device 565 similar to the switching device 500 depicted in FIG. 9. As illustrated, the switching device 565 extends through an opening 580. Although the opening 580 is shown as being positioned at the side of the body 555, the opening 580 may be positioned at a center of the body 555. In some embodiments, the switching device 565 is a pull-chain switch.

The light kit 540 further includes a mounting bracket 570 configured to connect the light kit 540 to the fan 100. As shown in FIG. 12, the mounting bracket 570 is removably secured to the light kit 540 via a bracket connector 585. The mounting bracket 570 extends from the bracket connector 585 through an opening of the backplate 550. In some embodiments, the mounting bracket 570 is threaded such that the mounting bracket 570 may screw into a corresponding receiving portion of the fan 100.

In some embodiments, the light kit 540 includes a knockout portion 575 of a driver housing 590. The knockout portion 575 may be, for example, an opening (or aperture) in the driver housing 590. In some embodiments, the knockout portion 575 extends through the backplate 550. The knockout portion 575 may assist in reducing vibration experienced by the light kit 540 due to the driver circuit 230. Additionally, reducing the vibration experienced by the light kit 540 further assists in minimizing excess noise created by the system.

Figure 13:
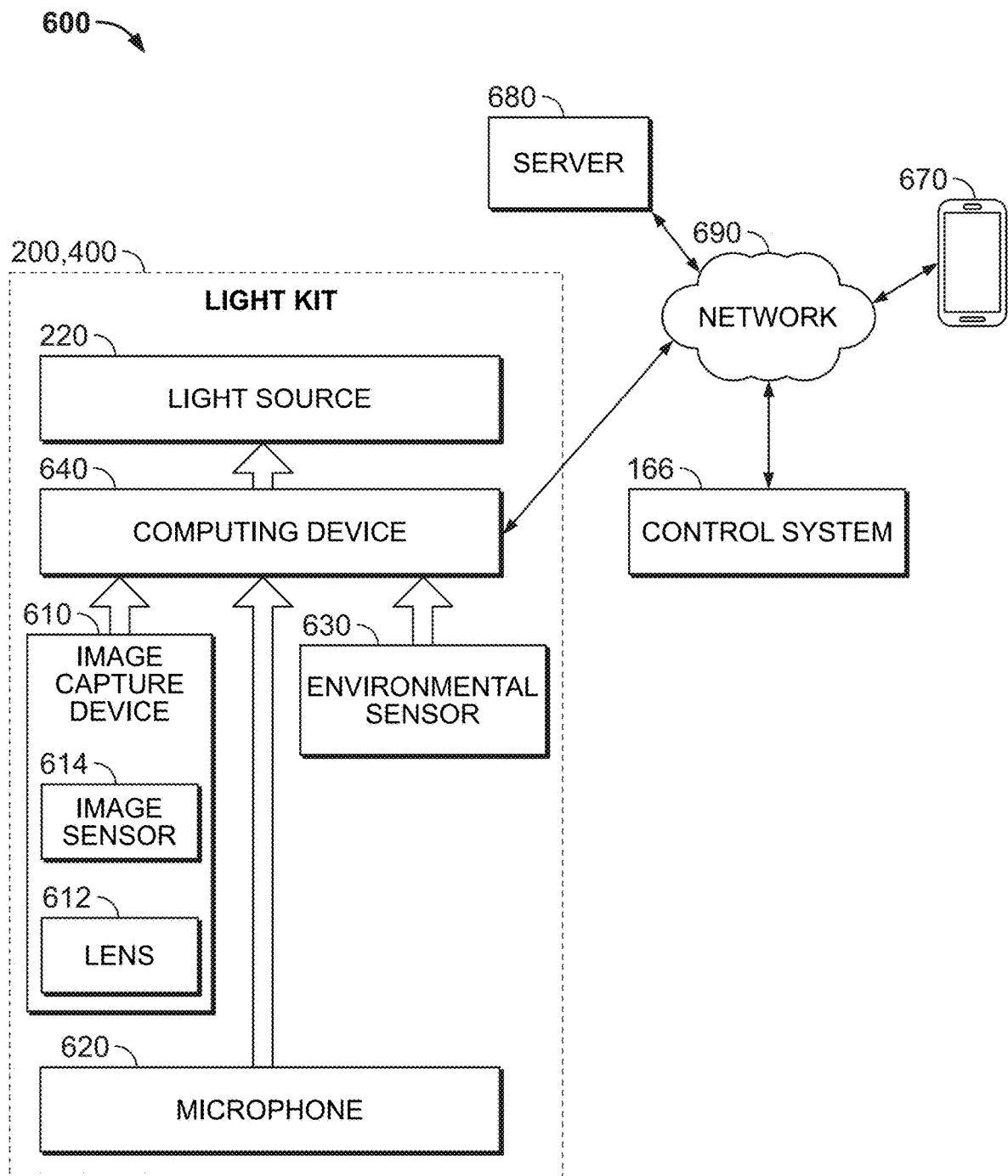
FIG. 13 provides a schematic of a system for a light kit according to some embodiments.

FIG. 13 depicts a block diagram of components of a system 600 for the light kit 200 discussed above with reference to FIGS. 4-8, light kit 400 discussed above with reference to FIGS. 9 and 10, and light kit 540 discussed above with reference to FIGS. 11 and 12. As shown, the system 600 includes an image capture device 610 (e.g., camera) that is included as part of the light kit 200, 400. In some embodiments, the image capture device 610 may be positioned within an opening (not shown) defined by the diffuser 250, 450 (FIGS. 6 and 10) of the light kit 200, 400.

It should be appreciated, however, that the image capture device 610 may be positioned at any suitable location on the light kit 200, 400.

In some embodiments, the image capture device 610 includes a lens 612 and an image sensor 614. The lens 612 may focus light (e.g., visible, infrared) onto the image sensor 614. More specifically, the lens 612 may focus light that is within a field of view of the lens 612. It should be appreciated that the field of view of the lens 612 may be any suitable value. For example, the lens 612 may be a panoramic lens having a field of view of about three hundred and sixty degrees (360°). In some embodiments, the lens 612 is a fisheye lens. More specifically, the fisheye lens may have a field of view between about one hundred and fifty degrees (150°) and about one hundred and eighty degrees (180°).

The image sensor 614 may convert the light into an image depicting whatever is within the field of view of the lens 612. In some embodiments, a portion of the first space 112 (FIG. 1) may be within the field of view of the lens 612. More specifically, the portion of the first space 112 may include a doorway (not shown) through which a person enters and exits the first space 112. In this way, the image capture device 610 may capture one or more images (e.g., video) of a person entering or exiting the first space 112.

In some embodiments, the system 600 includes a microphone 620 that is included as part of the light kit 200, 400. For instance, the microphone 620 may be positioned within an opening defined by the diffuser 250, 450 of the light kit 200, 400. It should be appreciated, however, that the microphone 620 may be positioned at any suitable location on the light kit 200, 400. In this way, the microphone 620 may detect audible sounds occurring in the first space 112. The microphone 620 may convert the audible sounds to electrical signals indicative of the audio in the first space 112.

The system 600 may also include one or more environmental sensors 630 included as part of the light kit 200, 400. The one or more environmental sensors 630 may be operable to sense at least one environmental parameter of the first space 112. For example, the one or more sensors 630 may detect humidity (e.g., specific, relative, etc.) of the air within the first space 112. Alternatively or additionally, the one or more sensors 630 may detect a temperature of the air within the first space 112. It should be appreciated that the present disclosure is not limited to the environmental parameters (that is, humidity and temperature) discussed above. For example, the environmental parameter may include, without limitation, a carbon monoxide (CO) sensor and a radon gas sensor.

Figure 14:
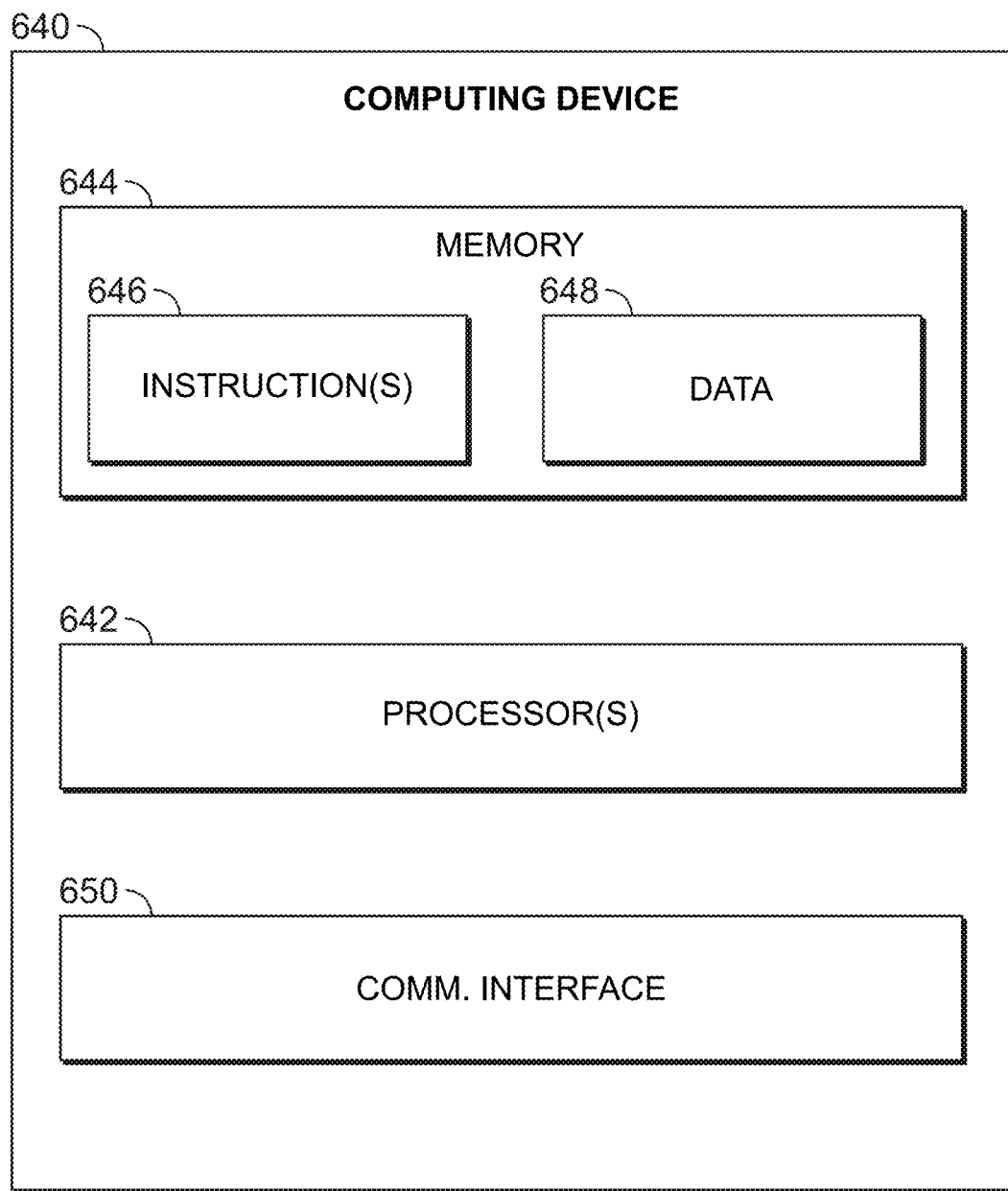
FIG. 14 provides a block diagram of components of a computing device according to some embodiments.

As shown, the system 600 includes one or more computing devices 640 included as part of the light kit 200, 400. FIG. 14 illustrates one embodiment of suitable components of the computing device(s) 640. As shown, the computing device(s) 640 includes one or more processors 642 configured to perform a variety of computer-implemented functions. As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits.

In addition, the computing device(s) 640 includes a memory device 644. Examples of the memory device 644 includes computer-readable media including, but not limited to, non-transitory computer-readable media, such as RAM, ROM, hard drives, flash drives, or other suitable memory devices. The memory device 644 may store information accessible by the processor(s) 642, including computer-readable instructions 646 that can be executed by the processor(s) 642. The computer-readable instructions 646 may be any set of instructions that, when executed by the processor(s) 642, cause the processor(s) 642 to perform operations. The computer-readable instructions 646 may be software written in any suitable programming language or can be implemented in hardware. In some example embodiments, the computer-readable instructions 646 may be executed by the computing device(s) 640 to perform operations, such as generating one or more control actions to control operation of the ceiling fan 100 and/or the light kit 200, 400. Alternatively or additionally, the computer-readable instructions 646 may be executed by the computing device(s) 640 to generate one or more control actions to control operation of one or more remote devices, such as the control system 166 associated with the first space 112. In some embodiments, the computer-readable instructions 646 may be executed by the computing device 640 to communicate information to one or more other remote devices.

The memory device 644 may further store data 648 that can be accessed by the computing device 640. In some embodiments, the data 648 includes image data captured by the image capture device 610, data indicative of an environmental parameter detected by the one or more sensors 630, audible sounds detected by the microphone 620, or any combination thereof.

Additionally, as shown in FIG. 14, the computing device(s) 640 may include a communications interface 650. In example embodiments, the communications interface 650 may include associated electronic circuitry that can be used to communicatively couple the computing device 640 with other devices, such as the control system 166, a user device 670, a server 680, or any other computing device. In some embodiments, the communication interface 650 may allow the computing device(s) 640 to communicate directly with other devices. In other embodiments, the communication interface 650 provides for communication with other devices over a network 690.

The network 690 may be any suitable type of network, such as a local area network (e.g., intranet), wide area network (e.g., internet), low power wireless network (e.g., Bluetooth Low Energy (BLE), Zigbee, etc.), or some combination thereof and can include any number of wired or wireless links. In general, communication over the network 690 may be implemented via any type of wired or wireless connection, using a wide variety of communication protocols, encodings or formats, and/or protection schemes.

Example communication technologies used in accordance with example aspects of the present disclosure may include, for instance, Bluetooth low energy, Bluetooth mesh networking, near-field communication, Thread, TLS (Transport Layer Security), Wi-Fi (e.g., IEEE, 802.11), Wi-Fi Direct (for peer-to-peer communication), Z-Wave, Zigbee, Halow, cellular communication, LTE, low-power wide area networking, VSAT, Ethernet, MoCA (Multimedia over Coax Alliance), PLC (Power-line communication), DLT (digital line transmission) , etc. Other suitable wired and/or wireless communication technologies may be used without deviating from the scope of the present disclosure.

In some embodiments, the computing device(s) 640 communicates with the control system 166 to activate (e.g., turn on) or deactivate (e.g., turn off) the light source 220 of the light kit 200, 400. Alternatively or additionally, the computing device(s) 640 may communicate with the control system 166 to activate or deactivate one or more light sources that are separate from the light source 220 of the light kit 200, 400. As will be discussed below in more detail, the computing device(s) 640 may be configured to activate one or more light sources based, at least in part, on data (e.g., data signals collected from the image capture device 610) indicating presence of one or more persons within the first space 112.

In some embodiments, the computing device(s) 640 communicates with the control system 166 to activate or deactivate the motor 140 (FIG. 2) of the fan 100 (FIG. 4, 9). In this way, rotation of the fan blades 130 may be controlled. In some embodiments, the computing device(s) 640 control operation of the image capture device 610 and the ceiling fan 100 independently of each other. For example, operation of the image capture device 610 and operation of the motor 140 may be controlled independently of each other. Alternatively or additionally, operation of the image capture device 610 and operation of the light kit 200, 400 may be controlled independently of each other. For example, operation of the image capture device 610 and the light source 220 may be controlled independent of each other. In some embodiments, the computing device(s) 640 is configured to activate the motor 140 of the fan 100 based, at least in part, on data (e.g., data signals collected from the image capture device 610) indicating presence of one or more persons within the room or area in which the fan 100 is located.

In some embodiments, the computing device(s) 640 communicates with the user device 670 over the network 690. The user device 670 may be any suitable type of device, such as, for example, a personal computing device (e.g., laptop or desktop), a mobile computing device (e.g., smartphone or tablet), a wearable computing device, an embedded computing device, a remote, or any other suitable type of user computing device. The user device 670 may include one or more computing device(s) with the same or similar components as described above with regard to computing device(s) 640 of the system 600. For instance, the computing device of the user device 670 may include one or more processors and one or more memory devices that store instructions that are executable by the computing device to cause user device 670 to perform operations, such as e.g., communicating one or more control signals over the network 690 to the computing device(s) 640 of the system 600. In this way, a user may control operation of both the fan 100 and the light kit 200, 400 via the user device 670. In addition, the user may use the user device 670 to control operation of the image capture device 610 independent of the fan 100 and the light kit 200, 400.

In some embodiments, the computing device(s) 640 communicates data to the user device 670 via communication interface 650. For instance, the computing device 640 may communicate image data captured by the image capture device 610 and/or audio data captured by the microphone 620 to the user device 670. The information may be displayed (e.g., via a display device) or otherwise presented (e.g., via audio speakers) to the user through a suitable interface. In this way, a user may observe activity occurring within the first space 112.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A ceiling fan comprising:
   one or more fan blades;
   a motor operatively coupled to the one or more fan blades, the motor configured to drive rotation of the one or more fan blades; and
   a light kit comprising:
      a panel having an edge;
      at least one light source positioned to illuminate the edge;
      a diffuser positioned such that the diffuser diffuses light exiting the panel, the diffuser including a patterned surface; and
      a light reflector positioned to reflect light exiting the panel;
      wherein the at least one light source is positioned between the light reflector and the diffuser.

2. The ceiling fan of claim 1, wherein the panel comprises a light guide.

3. The ceiling fan of claim 1, wherein the panel is positioned between the light reflector and the diffuser.

4. The ceiling fan of claim 1, wherein the at least one light source comprises a light emitting diode (LED) array having a plurality of LED light sources.

5. The ceiling fan of claim 1, wherein the one or more fan blades are positioned between the light kit and a ceiling to which the ceiling fan is mounted.

6. The ceiling fan of claim 1, further comprising:
   a body configured to accommodate the panel and the at least one light source.

7. The ceiling fan of claim 1, wherein the ceiling fan further comprises a first switching device configured to control operation of the motor, and wherein the light kit further comprises a second switching device configured to control operation of the at least one light source.

8. The ceiling fan of claim 7, wherein the second switching device is configured to adjust a color temperature of light emitted from the at least one light source.

9. The ceiling fan of claim 7, wherein the first switching device and the second switching device each comprise a pull chain switch.

10. The ceiling fan of claim 7, wherein the second switching device is mounted such that the second switching device extends through an opening defined by the diffuser.

11. A light kit for a ceiling fan, the light kit comprising:
   a panel having an edge;
   at least one light source positioned to illuminate the edge of the panel;
   a diffuser positioned such that the diffuser diffuses light exiting the panel, the diffuser including a patterned surface; and
   a light reflector positioned to reflect light exiting the panel, wherein the at least one light source is positioned between the light reflector and the diffuser.

12. The light kit of claim 11, wherein the panel is positioned between the light reflector and the diffuser positioned to diffuse light exiting the panel.

13. The light kit of claim 11, further comprising a mounting bracket configured to secure the light kit to the ceiling fan.

14. The light kit of claim 13, further comprising:
a body having a lip to support the panel; and
a backplate coupleable to the body such that the panel is positioned between the backplate and the lip of the body.

15. The light kit of claim 14, wherein the mounting bracket is removably coupled to the backplate via one or more fasteners extending through one or more slots defined by the backplate.

16. The light kit of claim 11, further comprising:
a switching device configured to control operation of the at least one light source.

17. The light kit of claim 16, wherein the switching device is mounted to a body of the light kit.

18. The light kit of claim 17, wherein the switching device is mounted such that the switching device extends through an opening defined by the diffuser.

19. The light kit of claim 11, wherein the at least one light source includes a light emitting diode (LED) array having a plurality of LED light sources.

20. The light kit of claim 11, further comprising:
a camera positioned within an opening defined by the diffuser.

* * * * *